United States Patent
Berthaud et al.

(10) Patent No.: US 7,555,408 B2
(45) Date of Patent: Jun. 30, 2009

(54) QUALIFYING MEANS IN METHOD AND SYSTEM FOR MANAGING SERVICE LEVELS PROVIDED BY SERVICE PROVIDERS

(75) Inventors: Jean-Marc Berthaud, Villeneuve Loubet (FR); Joel D. Dalsky, Streamwood, IL (US)

(73) Assignee: International Business Machines Corporation, Armonk, NY (US)

( * ) Notice: Subject to any disclaimer, the term of this patent is extended or adjusted under 35 U.S.C. 154(b) by 706 days.

(21) Appl. No.: 11/314,301

(22) Filed: Dec. 20, 2005

(65) Prior Publication Data

US 2006/0133296 A1 Jun. 22, 2006

(30) Foreign Application Priority Data

Dec. 22, 2004 (EP) ................... 04300937

(51) Int. Cl.
*G06F 11/30* (2006.01)
*G21C 17/00* (2006.01)
*H04L 12/26* (2006.01)
*H04L 12/28* (2006.01)

(52) U.S. Cl. .................. 702/184; 370/252; 370/254; 705/1

(58) Field of Classification Search ......... 370/252–256, 370/395.2, 408; 705/1–4, 11, 21; 702/184
See application file for complete search history.

(56) References Cited

U.S. PATENT DOCUMENTS

| | | | |
|---|---|---|---|
| 6,363,053 B1 | 3/2002 | Schuster et al. | |
| 6,366,563 B1 | 4/2002 | Weldon et al. | |
| 6,473,794 B1 | 10/2002 | Guheen et al. | |
| 6,512,746 B1 | 1/2003 | Sand | |
| 6,553,568 B1 | 4/2003 | Fijolek et al. | |
| 6,671,818 B1 | 12/2003 | Mikurak | |
| 6,957,186 B1 | 10/2005 | Guheen et al. | |
| 7,065,496 B2 * | 6/2006 | Subbloie et al. ............... 705/11 |

(Continued)

FOREIGN PATENT DOCUMENTS

CA  2 419 675 A1  9/2003

(Continued)

OTHER PUBLICATIONS

Office Action (Mail Date May 22, 2008) for U.S. Appl. No. 11/314,373, filed Dec. 20, 2005; Confirmation No. 6796.

*Primary Examiner*—Chirag G Shah
*Assistant Examiner*—Minh-Trang Nguyen
(74) *Attorney, Agent, or Firm*—Schmeiser, Olsen & Watts; William H. Steinberg (57) ABSTRACT

A method and system for managing a service level of a service provided by a service provider to a customer under a service level agreement. The measurement data is transformed into operational data. The operational data is evaluated through use of a formula represented as a tree, resulting in the evaluated operational data populating the nodes of the tree as the tree is traversed from the root node to leaf nodes. The evaluated operational data at the nodes includes a top result and intermediate results. The top result is qualified by being compared with specified service level targets for at least one service level period during which the service has been performed. The intermediate results are qualified by being compared with generated new service level targets.

20 Claims, 4 Drawing Sheets

U.S. PATENT DOCUMENTS

| | | |
|---|---|---|
| 7,130,807 B1 | 10/2006 | Mikurak |
| 7,165,041 B1 | 1/2007 | Guheen et al. |
| 2002/0049841 A1 | 4/2002 | Johnson et al. |
| 2002/0077836 A1 | 6/2002 | Elnozahy et al. |
| 2002/0120741 A1 | 8/2002 | Webb et al. |
| 2002/0143920 A1 | 10/2002 | Dev et al. |
| 2002/0167936 A1 | 11/2002 | Goodman |
| 2003/0053455 A1 | 3/2003 | Kryskow, Jr. |
| 2003/0145080 A1 | 7/2003 | Breese et al. |
| 2003/0179703 A1 | 9/2003 | Levy et al. |
| 2003/0185212 A1 | 10/2003 | Kelly et al. |
| 2003/0187966 A1* | 10/2003 | Sinha .................. 709/223 |
| 2003/0198235 A1 | 10/2003 | Weldon et al. |
| 2004/0136379 A1* | 7/2004 | Liao et al. ............ 370/395.21 |

FOREIGN PATENT DOCUMENTS

| | | |
|---|---|---|
| EP | 1 229 685 A2 | 8/2002 |
| EP | 1 267 584 A1 | 12/2002 |
| EP | 1 351 441 A2 | 10/2003 |
| GB | 2 349 715 A | 11/2000 |
| JP | 2001044994 A | 2/2001 |
| JP | 2001320370 A2 | 11/2001 |
| JP | 2002215408 A | 8/2002 |
| JP | 2002368750 A | 12/2002 |
| JP | 2003037630 A | 2/2003 |
| JP | 2003058653 A | 2/2003 |
| JP | 2003162591 A | 6/2003 |
| WO | WO 01/47190 A1 | 6/2001 |
| WO | WO 01/61524 A1 | 8/2001 |
| WO | WO 02/17065 A2 | 2/2002 |
| WO | WO 02/080459 A1 | 10/2002 |
| WO | WO 02/093894 A2 | 11/2002 |
| WO | WO 03/084133 A1 | 10/2003 |

* cited by examiner

QUALIFYING MEANS IN METHOD AND SYSTEM FOR MANAGING SERVICE LEVELS PROVIDED BY SERVICE PROVIDERS

CROSS REFERENCES TO RELATED INVENTIONS

This invention is related to U.S. patent application Ser. No. 11/314,373 entitled "METHOD AND SYSTEM FOR MANAGING SERVICE LEVELS PROVIDED BY SERVICE PROVIDERS", filed on Dec. 20, 2005, and U.S. patent application Ser. No. 11/314,375 entitled "ADJUDICATION MEANS IN METHOD AND SYSTEM FOR MANAGING SERVICE LEVELS PROVIDED BY SERVICE PROVIDERS", filed on Dec. 20, 2005, now U.S. Pat. No. 7,228,255.

BACKGROUND OF THE INVENTION

1. Technical Field

The invention relates to service management and service presentation systems wherein measurement data regarding services delivered by Service Providers to customers are gathered and handled to compute and communicate service indicators defined in Service Level agreements and, in particular, relates to qualifying means in a system managing the Service Levels provided by Service Providers.

2. Related Art

A Service Provider (SP) provides or manages resources for its customers. A resource can be a server, a particular application on a server, a networking device, people in a help desk to answer users, people to fix problems, people to manage and change systems configuration and location, . . . etc . . . or a complex solution made of multiple elements to accomplish or support a customer business process. The Service Provider and the customer can be different firms, or different departments in a large global enterprise where departments are organized as support services for other departments, e.g. Marketing, Research, Sales, Production, Normally, a Service Level Agreement (SLA) is signed between a provider and a customer to define the role of each party and to remove any ambiguity from the business relationship.

Such a SLA:

Identifies the parties involved in the agreement.

Describes the service to be provided, and identifies in a measurable and quantifiable manner indicators of the quality of the service on which obligations will be set, with a possible series of exceptions and stipulations in the way to calculate these indicators.

Defines the obligations, called Service Levels (SL), to be met on the identified indicators, so that the expected quality of the delivered services is set in an un-ambiguous manner.

Defines the agreement period for which these obligations are set forward.

Pre-defines penalties to be paid/executed by the SP if the commitment(s) is(are) not met. If a commitment is exceeded, a reward can also be predefined, to be paid by the customer.

Also defines reporting policies, corrective actions, dispute resolution procedures, termination criteria, intellectual property.

A SLA is encountered when considering utilities to be trusted "always-on" services such as providing water, electricity, gas, telephone, e-service (e.g., e-Business On Demand), etc. In fact, a SLA exists when a specific service offer including commitments is engaged with a customer.

By itself, a SLA does not bring any change in the level of service delivered. The Service Provider and/or the customer need to implement a Service Level Management (SLM) program that will actually result in higher levels of services. Indeed, a SLA only specifies the agreed criteria for determining whether or not a set of agreed service quality levels are met. When not met, the issue is to determine what caused the violation, maybe how to improve the service, or change the SLA or the provider. The Service Level Management begins with the development of new service levels for a new contract and continues throughout the life of the contract to ensure Service Level commitments are met and maintained.

The Service Level Management is commonly identified as the activities of:

negotiating, identifying and agreeing the measurable services that support the Business Process of a customer, and defining the SLA articulation in an offering for service with Service Level Objectives (SLO) also known as Service Level Targets (SLT), monitoring resources used to deliver a service and capturing data on how well these resources perform from monitors or from logs, calculating intermediate and high level Service Levels results or scores using the predefined service parameters formulae (called metrics) and taking into account all kinds of exceptions that can occur, assessing attainment versus commitments and possible penalties or rewards, assessing impact of operational outages or degradations in terms of SLAs (services) and financial impacts, alerting in real-time of possible or effected outages, diagnosing problems for resolution, enforcing corrective actions wherever possible to regulate the delivery system and therefore try to proactively guarantee the achievement of obligations, reporting to the provider and the customer on real numbers versus contractual numbers, and sealing final numbers to be used for rebates or rewards, rebating to customers when commitments are not achieved, or rewarding the provider when commitments are exceeded, and refining, improving and reviewing SLA definitions, Service Levels and services that support the customer's Business Process.

Today, there are SLA Management Systems which are automated for managing SLAs such as IBM Tivoli Service Level Advisor, Computer Associates SLM, Digital Fuel or InfoVista. They are built to accomplish, at least, a minimum set of tasks such as capturing data from monitoring systems, and they participate or supply information to other service management activities such as alerting, enforcing or reporting.

However, for proper Service Level Management and in particular for continuous and deterministic service improvement, or for refining and renegotiating SLA contract terms, producing Service Level results data from measurement data alone is not sufficient. First, not only the committed top service level results need to be produced, but also intermediate SL results representing service components meaningful to the Service Provider and used in this top high level result, or Service Level related summary and detailed data. Secondly, it is necessary to show how base measurement data related to technical elements in the service delivered contribute to the SL result so that it is possible to trace back what needs to be modified to improve the SL result and it is possible to quantitatively track the detailed real effect of improvement actions on the technical elements of the solution. These data can then be used by people or by other enterprise management automated solutions (auto-correcting systems, reporting systems, data mining systems, etc.) to pinpoint areas for improvement and to track results of actions.

Few common elements can be identified in Service Levels for devising a common qualification policy to be applied on measurement data for this purpose, as there can be significant variations between two Service Levels, and as it depends on each Service Level business logic which can in turn be specific to each customer. This needs to be adapted to each case. To further increase the complexity of the case, even two similar or analogous Service Levels can require significantly different processes to produce close but different intermediate Service Level or summary data, or even data in slightly different forms (like a percentage which can be a number between 0 and 100, or a decimal number between 0 and 1). Such cases exist because the surrounding systems using the data produced by the SL Management solution can change for each customer, or because the customer requires to see different intermediate and lower level results contributing to the end service level, or because the operational teams delivering the services are not the same and have different processes requiring different data.

None of the above mentioned solutions addresses the problem in a satisfying manner. They need to constantly redevelop a dedicated process specific to each SL business logic and each environment. Therefore these solutions spend development resources and maintenance activities on the SL Management solution provider side, are costly, and become a bottleneck for the use and deployment of the SL Management solution. In some cases, these processes are done as part of data extraction mechanisms from database to database, and lack flexibility and need specialized skills.

SUMMARY OF THE INVENTION

The present invention provides a method for managing at least one service level of a service provided by a service provider to a customer of the service provider under a service level agreement, said service level agreement being a contract between the service provider and the customer, said method comprising:

adjudicating measurement data to correct the measurement data in accordance with at least one adjudication element that provides information relating to how to correct the measurement data, said information in each adjudication element identifying which data of the measurement data is to be changed by said each adjudication element;

transforming the adjudicated measurement data into operational data by reorganizing the adjudicated measurement data into one or more groups of data;

evaluating the operational data by applying a formula to the operational data, said evaluating resulting in the operational data being configured for being subsequently qualified, said formula being expressed as a tree comprising nodes, said evaluating comprising traversing the tree from leaf nodes of the tree to a root node of the tree, said evaluating comprising populating the nodes of the tree with the evaluated operational data as the tree is traversed from the leaf nodes to the root node, said evaluated operational data at the root node denoted as a top result, said evaluated operational data at the nodes other than the root node denoted as intermediate results; and qualifying the top result and the intermediate results after said evaluating, said qualifying the top result comparing the evaluated operational data at the root node of the tree with specified service level targets for at least one service level period during which the service has been performed, said qualifying the intermediate results comprising comparing the intermediate results with generated new service level targets, wherein said adjudicating, transforming, evaluating, and qualifying are performed by software modules of an execution engine.

The present invention provides a system for managing at least one service level of a service provided by a service provider to a customer of the service provider under a service level agreement, said service level agreement being a contract between the service provider and the customer, said system comprising an execution engine for performing a method, said method comprising:

adjudicating measurement data to correct the measurement data in accordance with at least one adjudication element that provides information relating to how to correct the measurement data, said information in each adjudication element identifying which data of the measurement data is to be changed by said each adjudication element;

transforming the adjudicated measurement data into operational data by reorganizing the adjudicated measurement data into one or more groups of data;

evaluating the operational data by applying a formula to the operational data, said evaluating resulting in the operational data being configured for being subsequently qualified, said formula being expressed as a tree comprising nodes, said evaluating comprising traversing the tree from leaf nodes of the tree to a root node of the tree, said evaluating comprising populating the nodes of the tree with the evaluated operational data as the tree is traversed from the leaf nodes to the root node, said evaluated operational data at the root node denoted as a top result, said evaluated operational data at the nodes other than the root node denoted as intermediate results; and qualifying the top result and the intermediate results after said evaluating, said qualifying the top result comparing the evaluated operational data at the root node of the tree with specified service level targets for at least one service level period during which the service has been performed, said qualifying the intermediate results comprising the intermediate results with generated new service level targets, wherein said adjudicating, transforming, evaluating, and qualifying are performed by software modules of an execution engine.

DETAILED DESCRIPTION OF THE INVENTION

The present invention provides a method and system for managing the Service Levels (SL) provided by Service Providers to a customer, to produce any intermediate values necessary to explain a SL result and to automatically qualify these intermediate results and the detailed operational data used in calculations with regards to their participation in achieving or not Service Level Targets.

The present invention relates to a system for managing a service level provided by a service provider to a customer comprising a processing engine for transforming measurement data composed of data point(s) into operational data using service time profiles and Services Level business logics, and evaluating the operational data in order to produce Service Level results and qualified operational data. In the processing engine, the means for evaluating the measurement data provide an evaluation tree enabling to produce intermediate values and top result which are stored in each node of the tree. The processing engine comprises means for qualifying the intermediate values and the operational data after evaluation, starting from the top result and going down to each intermediate data point through top-down exploration of the tree, this qualification being made by producing for each node of the evaluation tree a set of new target values for each business period (i.e., service level period) through a succession of reverse operations from top Service Level Targets, and by comparing values stored in each node of the evaluation tree with these new target values.

A system according to the invention comprises a repository of the descriptions of the Service Level Agreement (SLA) corresponding to each Service Level, a first datastore for the actual measurement data, a second datastore for adjudication elements, a third datastore for SL results, operational data, adjudicated data and a processing engine for processing an evaluation cycle for each Service Level.

Figure 1:
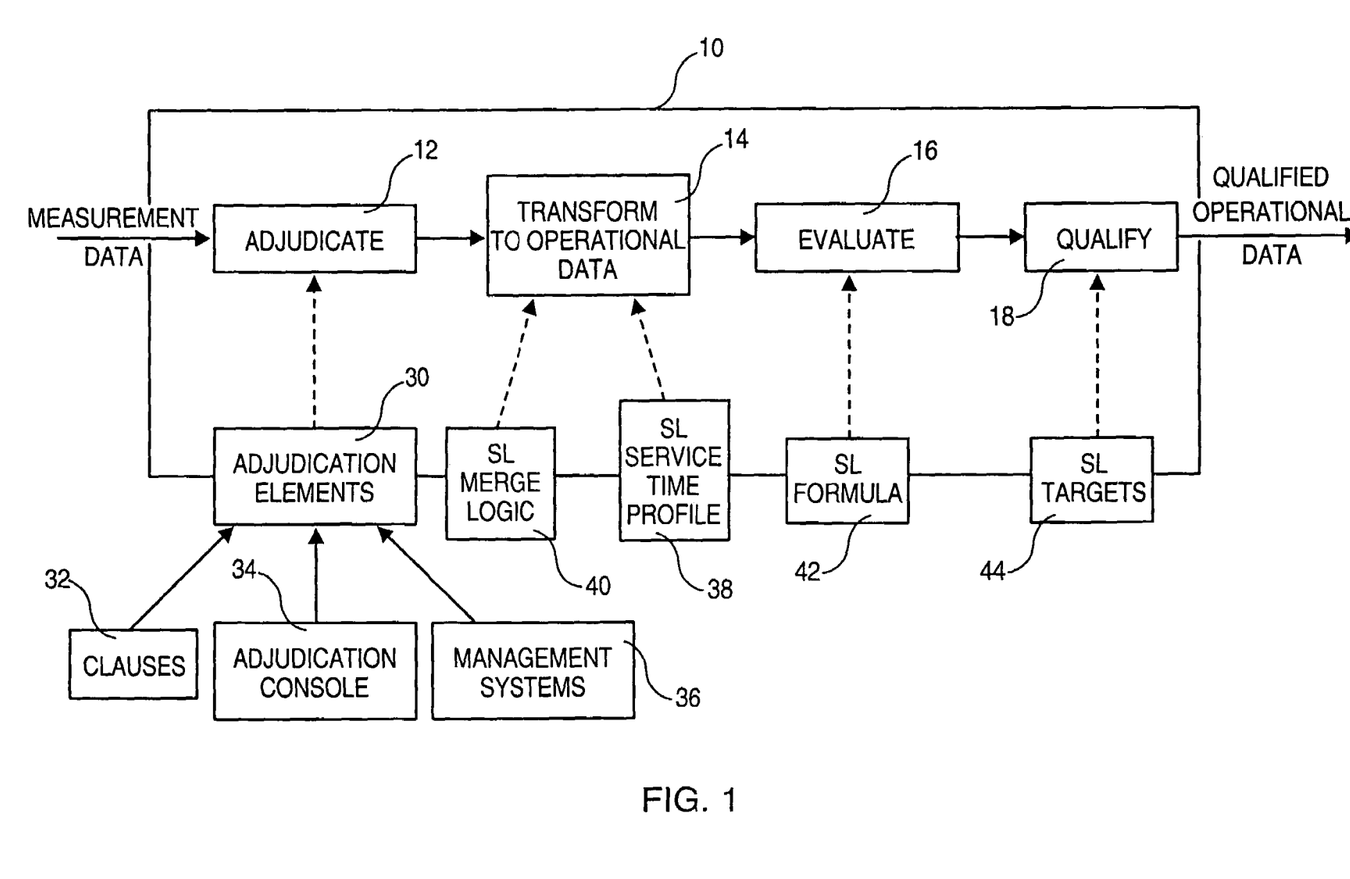
FIG. 1 is a schematic block-diagram representing the process engine used in the invention and the sequence of steps implemented therein.
Figure 2:
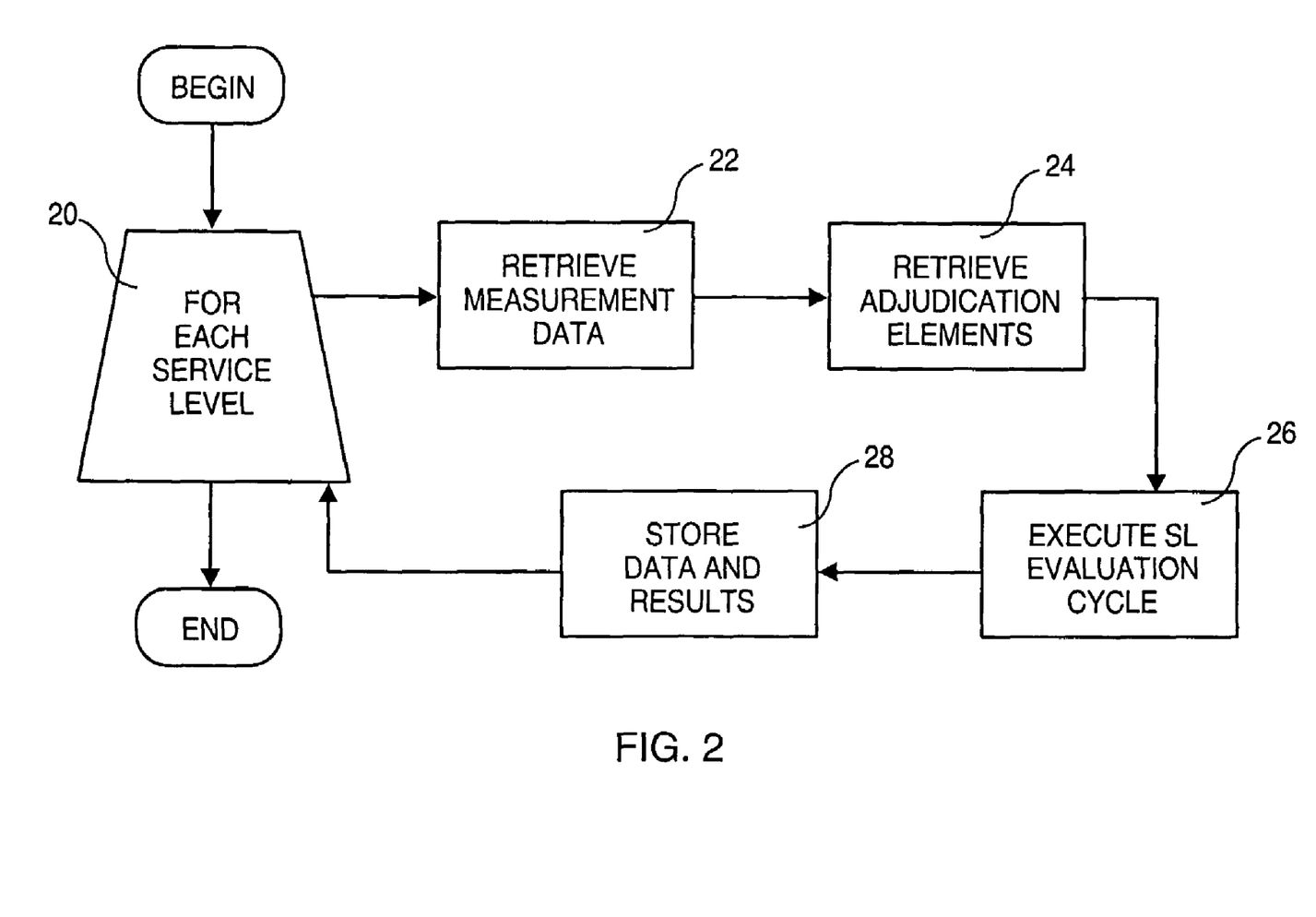
FIG. 2 is a schematic diagram illustrating the evaluation cycle implemented for each service level.

The processing engine 10, illustrated in FIG. 1, includes software modules of a computer system to process the measurement data received as input and to provide qualified operational data as output. As described hereafter, the process performed by the processing engine 10 comprises essentially four main steps: a step of adjudicating the input measurement data (step 12); a step of transforming the adjudicated data into operational data (step 14); a step of evaluating these operational data (step 16); and a step of qualifying the operational data (step 18). In other words, as illustrated in FIG. 2, the process is implemented for each Service Level (SL) 20. First, the measurement data for the service level is retrieved (step 22), such measurement data being related to the evaluated SL period (i.e., business period). Then, all the adjudication elements related to the evaluated SL period are retrieved (step 24) from the second datastore for the adjudication elements and the SL evaluation cycle can be executed (step 26) as per SLA descriptions. Finally, the adjudicated data, the qualified operational data, and the SL results are stored (step 28) into the third datastore.

Referring again to FIG. 1, the step 12 of adjudicating is used to correct the actual measurement data to reflect the real domain of responsibility of the Service Provider, or to reflect reality because, for some reason, the monitors provide incorrect data. A new set of adjudicated data is produced by this step. Although the actual measurement data are different from the adjudicated ones, reference data to the actual measurement data are still available to be used by other systems requiring the original observed data, or so that changes can be audited in support of legal purposes.

Adjudication elements 30 provide information relating to how to correct the measurement data. The adjudication elements 30 may be sourced from the contract clauses 32 created at contract signing time and are valid for the whole Service Level life (exclusion cases, special conditions, limits on resources, etc.). The adjudication elements 30 may also be created, from the adjudication console 34, at any time during the Service Level life by Service Managers when executing their Service Level Management tasks. Finally, the adjudication elements 30 may be created automatically from other Enterprise Management systems 36 like Problem and Change Management, using responsibility fields and other information. The adjudication elements 30 hold a reason for the modifications they bring, which will be shown to the end customer and must be agreed by the customer, and information about the creator who/which is first authenticated and goes through processes of authorization.

Each "modified" (i.e., adjudicated) data point contains a list of references to applied adjudication elements and clauses in their specific order of appliance, for auditing, detailed reporting/explanation, customer relationship, legal justification and later billing exploitation (rebate or reward). Each adjudication element 30 is persistently saved/locked into an unchangeable state as soon as it is used so that no more modification can happen to the locked adjudicated element, for guaranteeing that proper information is available for auditing controls.

This step also supports a parallel information management process whereby the adjudication can be sealed so that no more modification can be made to the Service Level result and other produced data for a given Service Level period; i.e. no more adjudication element can be created for this Service Level period. This corresponds to a process of finalization just before result data is sent to billing systems or used for other legal purposes, and after they have been reviewed and agreed upon with the customer.

Returning to FIG. 1, the second step performed by the processing engine 10 is to transform (step 14) the measurement data, adjudicated or not, into operational data by using a service time profile 38 describing the Service Level time logic (also commonly referred to as a service calendar and defining different periods of service with possibly different SLT's), and the specific business logic defined in the Service Level. It organizes/merges the measurement data, adjudicated or not, into a more appropriate form for evaluating attained service levels and producing summary Service Level results. In addition, each produced operational data point refers back to the original measurement data point(s) it comes from, for tracing and auditing purposes. For example, a Service Level time logic can contain critical periods and off-peak hours in a month where different targets are to be achieved, or periods of no service. Monitoring devices and data collection systems have no knowledge of this information which is contract specific, and measurement a data point can cover multiple such periods. Appropriate sets of data points need to be produced for generation of service level results and comparison with different service level targets. And to continue the example, if measurements are coming from different probes monitoring the same resource, they need to be merged 40 using a logic specified in the Service Level before they can be used for Service Level calculations when evaluating and producing summary Service Level results.

In more details and as an example, the step of transforming the measurement data, adjudicated or not, into operational data can be decomposed in two sub-steps. This example illustrates how adjudicated data are propagated to the next steps of the evaluation process.

1. Merging of several measurement data on the same monitored resource, independently from the SL Service Time Profile (or business schedule). As an example, 3 probes are monitoring a URL, and it is defined in the SL that an outage is declared when all 3 probes agree to see an outage, and that this outage lasts from the first probe measurement detecting it to the first probe measurement returning to normal. In this case, only one measurement type is seen=observed URL state, so there will be only one group. 3 measurements feeds come in, identified by their different resource ids. These are put in one group of measurement, and then merged using the supplied logic.

2. Split of measurement data against service Time Profile periods (Service Level time logic) to create separate sets for each period. This step allows applying the same process in parallel to each set of data without caring anymore about the Service Time Profile before getting to the SL result comparison stage. As an example, if an outage lasts from 3 pm to 11 pm and the Service Time Profile states that in a day, 8 am to 8 pm is normal hours, and outside it is off peak hours with a different target, then the outage needs to be split in two pieces, one from 3 pm to 8 pm with business period state="normal hours", and one from 8 pm to 11 pm with business period state="off peak hours".

Then, the operational data are evaluated (step 16) through a Service Level evaluation using a formula 42, specifying which data are to be fed as input, what is the form of data (response time, availability, counts, states, etc.), and how the input data should be processed to produce summary intermediate and top Service Level results. There is one set of data produced per business period in the Service Time Profile. The data produced by this step are to be used directly for Service Level attainment comparison, for reporting on service levels, and for input to other Enterprise Management systems. It matches what is contractually committed by the provider and represents a negotiated value and quality of the delivered service.

In the evaluation step, operational data are processed through the Service Level evaluator using a formula expressed in tree form. The tree comprises nodes and branches. Each branch traverses nodes of the tree and extends between the root node and a leaf node ("leave"). A leaf node or "leave" is a terminal node of a branch.

The evaluator runs on operational data produced by the previous stage in the SL Management solution which is the transformation of measurement data into operational data. But in fact, it can do both at the same time as it is going through the evaluation tree (i.e., both the transformation of measurement data into operational data and the evaluation step can be performed at the same time by going through the evaluation tree).

The tree has operators at its nodes, for example +, −, *, /, elapsed time, percentile, count, etc. which can be unary, binary or n-ary operators. Arguments of these operators are child nodes of these operator nodes. The leaves of the tree contain operators with no arguments, such as: quantities (e.g., constants or things) to be calculated from the Service Level environment (for example, business schedule state durations) and/or references to the measurement data used by the SL evaluation.

The references to data must specify exactly which data to be used in the total set of supplied data to the evaluation stage, for example: which measurement type and other measurement identifiers and what type of data (state or response time), because some operators can accept both types of data and need to have a slightly different behavior depending on the type of data, in particular the operators used to select subsets of the data according to some conditions.

The tree is first precompiled (prior to the evaluating step) in an internal structure that will be fast to interpret and explore at evaluation time (i.e., the precompiled tree is interpreted during said evaluating). This is particularly well suited for recursive algorithms which allow to maintain a clear and conceptual interpreter code.

The Evaluator interprets the precompiled SL formula using a recursive algorithm and going through the evaluation formula tree from bottom to top (i.e., from the leaf nodes of the tree to the root node of the tree). Whether the traversal up the tree is rightmost first or leftmost first is not important. The traversal up the tree populates the nodes of the tree with evaluation results as it progresses towards the top. When a node identified as being an intermediate or summary result is reached, it publishes the corresponding results for use later, and continues the process until top which is another point of result publication.

When it is on an operator node, it calls the appropriate function to produce results, using the formula operator code as index into a function table in an operator library. When it is on a measurement variable node, it produces detailed Operational data (not yet qualified) using the process of transformation of measurement data into operational data.

The evaluation tree can be described through a mathematical formula with variables, operators and constants, and a series of descriptions to associate the variables with real measurement input data. The formula describes how to produce an evaluation result using the selected operators, constants, and variables. The formula also indicates which intermediate compounds (I.e., components) in the formula are to be stored as intermediate results of the evaluation step. A mathematical formula can always be expressed as a tree, and vice-versa.

Examples of Sample Custom Metric Definitions are Supplied Below.

First Sample Custom Metric Definition

```
<metric name="SampleOffComp1.CMETest_free_memory">
    <var A, indicator, MsmtTyp.MsmtTyp_Nm.TotalAvail,
    AMY_MEMORY >
    <var B, indicator, MsmtTyp.MsmtTyp_Nm.TotalCache,
    AMY_MEMORY >
    <formula (/ (− A B)[1,Free memory in bytes]
        A [2,Total memory in bytes])>
</metric>
```

This evaluation tree returns the free percentage of memory as a [0, 1] number, calculated from total memory and memory used for caching, and stores two intermediate results in the summary operational data store which are the number of bytes in free memory and the total memory size in bytes.

Second Sample Custom Metric Definition

```
<metric name="SampleOffComp2_PCR36_URL.CMETest_PCR36
URL">
    <var A, state, EP4_URL >
    <formula (*(/ (− (sl_duration)
        (elapsed_time A s:"Unavailable")
        )[2, "Available milliseconds"]
        (sl_duration)[1, "Scheduled milliseconds"]
        )
        100.0
    )>
</metric>
```

This evaluation tree really means that the measurement data points, from EP4_URL data source, assigned to this Service Level will be grouped under the variable name A, and that the final result is to be calculated as:

$$\frac{(SL\_scheduled\_time - time\ elapsed\ in\ Unavaiable\ state\ by\ variable\ A)}{SL\_scheduled\_time} * 100$$

The returned number will be between 0 and 100. It also produces 2 intermediate results to be stored in the summary operational data store, the available time in milliseconds (column 2), and the SL scheduled time in milliseconds (column 1).

The following diagram shows the internal representation of the second sample evaluation tree in the interpreter, and the production of results at each stage of the tree, and the moments (1) and (2) where intermediate results will be stored in the summary operational data store.

The operational data resulting from adjudicated data are qualified (step 18) with regards to their participation in achieving or not achieving results compared to Service Level targets 58 for each business period during which the service (s) provided by the Service Provider has been performed. The qualifying step identifies good operational data points with labels like "In Profile" (=contributes to good SL result) or bad operational data points with labels like "Out Of Profile" (=contributes to degrading SL result. Thus, the good and bad operational data points meet and do not meet, respectively, the specified service level targets. The qualifying step also determines deltas to breaking limit (i.e., differentials by which the identified data points differ from the specified service level targets). The deltas to breaking limit (i.e., differentials) are used to determine a margin by which the identified good and/or bad data points contribute to the high level SL results; i.e., contribute to meeting or not meeting the specified service level targets (for example: time remaining before "Out Of Profile" or violation, for problem resolution times, etc.). The deltas to breaking limit (i.e., differentials) and the margin may be stored in the third datastore.

This enriching of operational data is to be used by the Service Provider Managed Operations people and by their automated systems to continuously track the detailed contribution to the end to end final service level, to understand their impact on it, and to help them prioritize work and actions in order to guarantee the end to end service level. As an example of the latter, the time remaining before violation for problems resolution is an information to be used to understand which problems to solve first in the list of currently open problems. As an example of the former, showing which detailed metrics contribute to SL result degradation helps to pinpoint quickly in the input data set what are the points to improve, and to control the effect of corrective actions. This is possible because each operational data point points back to adjudicated data, which in turn has in its history the list of modifications made to the initial data points. In addition, the delta to breaking limit information gives an idea of the amount of effort to spend to improve the service level, and of where to concentrate to yield best benefits.

This invention allows qualifying the operational data stored in each node of the formula tree, with regards to the SL Targets, i.e.: top results, intermediate and summary results, and detailed input operational data.

Figure 3:
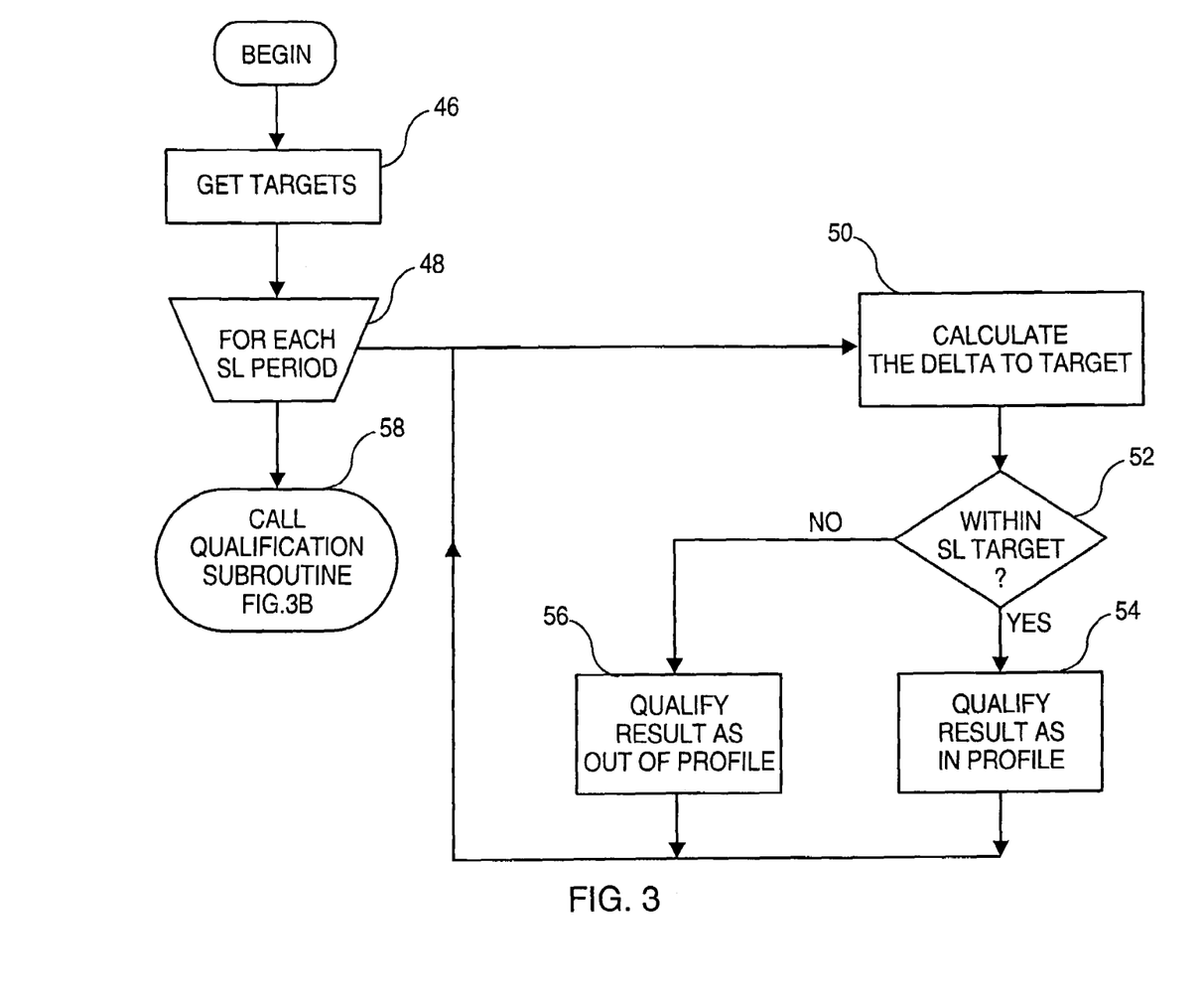
FIGS. 3 and 4 are flow charts of the steps implemented in the process of evaluating and qualifying the measurement data according to the invention.
Figure 4:
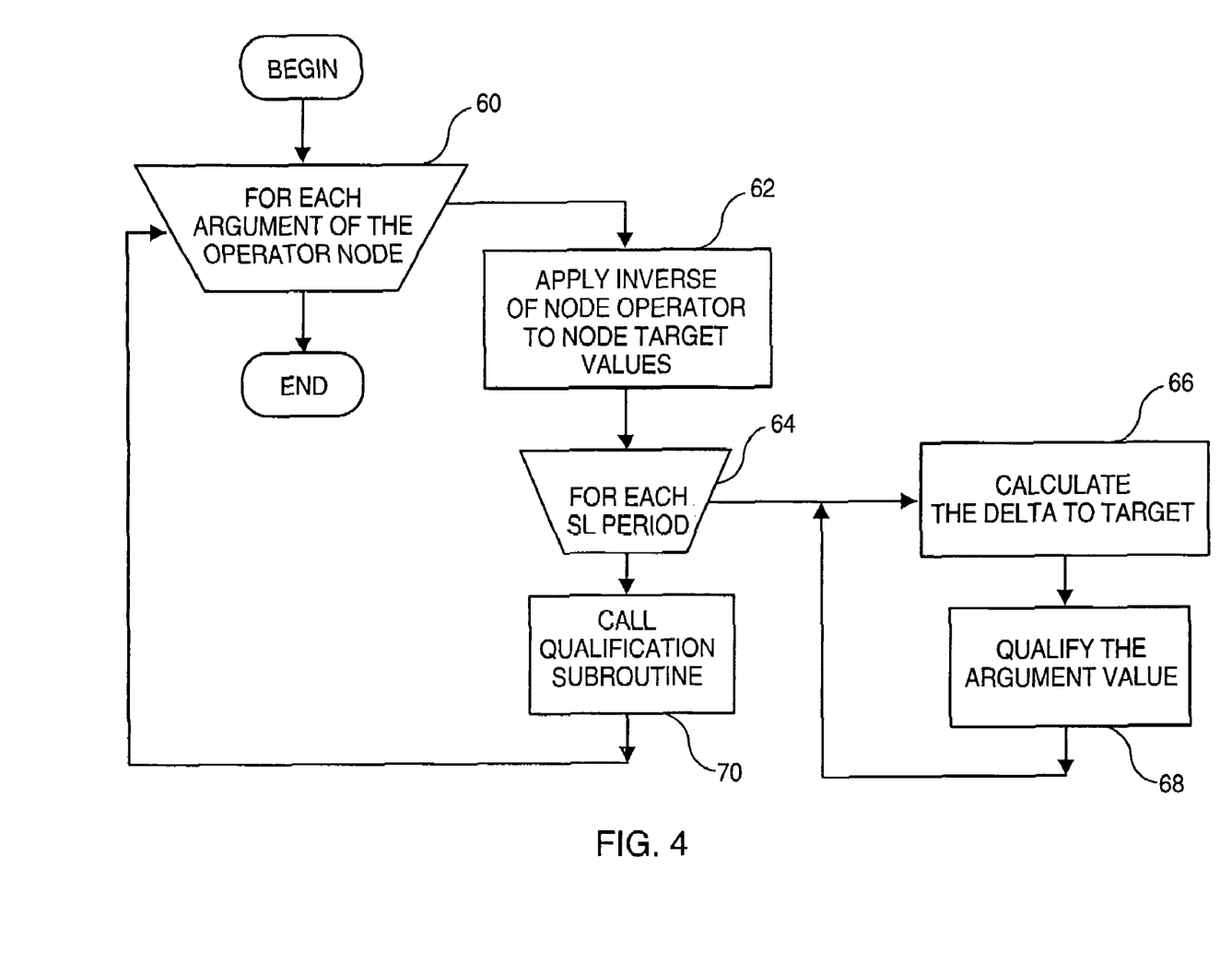

As illustrated in FIG. 3 and FIG. 4 the operational data qualification is a recursive algorithm. First, as illustrated in FIG. 3, the process gets the targets for the Service Level (step 46). The process is implemented for each SL period 48 by calculating the difference between the Service Level target and the root node result value called the delta (i.e., differential) to target (step 50). Then, it is determined whether the delta to target is within the SL target range or not (step 52). If it is the case, the top result is qualified as "In profile" (step 54). If it is not the case, the top result is qualified as "Out of profile" (step 56). Then, the process calls the qualification subroutine (step 58) described in FIG. 4.

In the qualification subroutine process, each operator node in the formula tree propagates back the qualification to its arguments (again "Out of profile" and "In profile", and calculation of delta to target), using a rule specific to each operator and the set of breach values (i.e., the set of service level targets) that were used to qualify its result, and recursively generates a set of new breach values (i.e, new service level targets), one for each argument, for further propagation in the tree down to its leaves. This can be seen as using, in the qualification, an inverse operator of the evaluation operator.

In more details, the process illustrated in FIG. 4 is implemented for each argument of the operator node 60 by first applying the inverse of the node operator to the node target SL values in order to produce a set of new target values (step 62) (i.e., generating a new service level target comprises applying an inverse of the operator at a node to a service level target currently at this node to generate the new service level target for the argument at the child node of this node). Then, a sub-process is implemented for each SL period 64. This one consists in calculating the difference between the new target value and the argument data which is called the delta to target and store it (step 66), and qualifying the argument data points as "in profile" or "out of profile" as above (step 68). This qualification can be made by propagating the qualification information in output data point(s) directly to the input data without using any 'target rule'. In such a case, the calculation of targets for input data is still needed for calculating the deltas to target. This is the case for example of binary arithmetic operators: if the result is out of profile, both input arguments are out of profile, because both contribute equally to the result. The other way is to calculate the target on inputs, calculate the deltas to target, and to qualify accordingly.

Then, the qualification routine is called and applied recursively to each argument with new SL target values of the corresponding lower nodes/operators (step 70) so that they can in turn qualify their argument data and continue the process.

An illustration of the process is shown in the tree form below, associated with the second sample given previously. The text in underlined characters means in profile, and the text in italic characters means out of profile. The text in normal characters shows cases where the operational data may not be not qualified (implementation choice), because they are calculation constants for example. The delta to target is not shown. A set of data points can have each of its points being qualified differently, such as the one under variable A.

The system which is described above has many advantages like the following:

The evaluation formula tree is something which can easily be represented in text form or in XML forms for exchange with other systems like engagement and contract description systems, or for computer driven evaluation task distribution taking into account service levels like in GRID computing. It can also be part of the Service Level contract signed with the customer to unambiguously define how a service level is going to be evaluated and be taken directly from there.

It is very easy to take one evaluation tree, and to change it slightly to produce another Service Level with slight differences (like the case of percentage mentioned above). It is also quite easy to pick parts of evaluation trees to reuse them in other evaluation trees, or to identify in advance reusable parts by associating to them intermediate/summary results: quick reuse and identification of what is reusable.

It is very easy to pre-compile the evaluation in a form which will speed up processing, while keeping the advantages of an interpreter.

The interpreter allows to change dynamically the tree structure and to support changes to measurements or to a Service Level definition as the SL goes through its life cycle and it gets refined with the customer to better reflect the business value of the evaluated service, without changing anything to the SL Management solution or defining new contract and offering records to replace old ones.

The process is independent of the Service Levels, all service levels have targets and therefore have comparison operators. This is a universal process.

The solution requires extension or development only when new comparison operators are used which didn't exist previously, or when new evaluation operators are introduced in the SL evaluation engine (the reverse operator must be also developed in the qualification engine).

Complex evaluation formulas can be qualified down to the detailed operational data with this mechanism, that would otherwise be very difficult.

The qualification of operational data at all stages of the evaluation tree (intermediate, summary and detailed data) with delta to targets helps to prioritize work and actions in the activities to guarantee end to end service levels by focusing on the elements which will fail first.

What is claimed is:

1. A method for managing at least one service level of a service provided by a service provider to a customer of the service provider under a service level agreement, said service level agreement being a contract between the service provider and the customer, said method comprising:

adjudicating measurement data to correct the measurement data in accordance with at least one adjudication element that provides information relating to how to correct the measurement data, said information in each adjudication element identifying which data of the measurement data is to be changed by said each adjudication element;

transforming the adjudicated measurement data into operational data by reorganizing the adjudicated measurement data into one or more groups of data;

evaluating the operational data by applying a formula to the operational data, said evaluating resulting in the operational data being configured for being subsequently qualified, said formula being expressed as a tree comprising nodes, said evaluating comprising traversing the tree from leaf nodes of the tree to a root node of the tree, said evaluating comprising populating the nodes of the tree with the evaluated operational data as the tree is traversed from the leaf nodes to the root node, said evaluated operational data at the root node denoted as a top result, said evaluated operational data at the nodes other than the root node denoted as intermediate results; and qualifying the top result and the intermediate results after said evaluating, said qualifying the top result comparing the evaluated operational data at the root node of the tree with specified service level targets for at least one service level period during which the service has been performed, said qualifying the intermediate results comprising comparing the intermediate results with generated new service level targets, wherein said adjudicating, transforming, evaluating, and qualifying are performed by software modules of an execution engine.

2. The method of claim 1, said comparing the evaluated operational data at the root node of the tree with the specified service level targets identifying data points selected from the group consisting of good data points of the operational data meeting the specified service level targets, bad data points of the operational data not meeting the specified service level targets, and combinations thereof.

3. The method of claim 1, wherein the method further comprises:

precompiling the tree prior to said evaluating, and
interpreting the precompiled tree during said evaluating.

4. The method of claim 3, wherein said interpreting the precompiled tree employs a recursive algorithm to traverse the tree from the leaf nodes to the root node.

5. The method of claim 1, wherein said qualifying further comprises:

determining differentials by which the identified data points differ from the specified service level targets;
determining, from the differentials, a margin by which the identified data points contribute to meeting or not meeting the specified service level targets; and
storing the differentials, the margin, or differentials and the margin in a datastore.

6. The method of claim 1, wherein the intermediate results comprise an operator at each node other than the root node, wherein the operator at each non-leaf node has an argument that is a child node of said each non-leaf node, and wherein the operator at each leaf node does not have an argument.

7. The method of claim 6, wherein the operator at each leaf node comprises a quantity to be calculated from an environment of the at least one service level, a reference to measurement data to be used during said evaluating, or a combination thereof.

8. The method of claim 6, wherein the operator comprised by each node has an operator code that is used as an index into a function table in an operator library.

9. The method of claim 6, wherein said qualifying the intermediate results comprises performing a recursive algorithm to traverse the tree from the root node to the leaf nodes by:
   recursively generating the new service level targets for the operators at the nodes other than the root node by using a rule specific to each operator; and
   calculating differentials by which the intermediate results at the nodes other than the root node differ from the corresponding new service level targets to identify data values selected from the group consisting of good data values meeting the new service level targets, bad data values not meeting the new service level targets, and combinations thereof.

10. The method of claim 9, wherein said recursively generating the new service level targets comprises applying an inverse of the operator at each non-leaf node to a service level target currently at said each non-leaf node to generate the new service level target at a child node of said each non-leaf node.

11. A system for managing at least one service level of a service provided by a service provider to a customer of the service provider under a service level agreement, said service level agreement being a contract between the service provider and the customer, said system comprising an execution engine for performing a method, said method comprising:
   adjudicating measurement data to correct the measurement data in accordance with at least one adjudication element that provides information relating to how to correct the measurement data, said information in each adjudication element identifying which data of the measurement data is to be changed by said each adjudication element;
   transforming the adjudicated measurement data into operational data by reorganizing the adjudicated measurement data into one or more groups of data;
   evaluating the operational data by applying a formula to the operational data, said evaluating resulting in the operational data being configured for being subsequently qualified, said formula being expressed as a tree comprising nodes, said evaluating comprising traversing the tree from leaf nodes of the tree to a root node of the tree, said evaluating comprising populating the nodes of the tree with the evaluated operational data as the tree is traversed from the leaf nodes to the root node, said evaluated operational data at the root node denoted as a top result, said evaluated operational data at the nodes other than the root node denoted as intermediate results; and
   qualifying the top result and the intermediate results after said evaluating, said qualifying the top result comparing the top result with specified service level targets for at least one service level period during which the service has been performed, said qualifying the intermediate results comprising comparing the intermediate results with generated new service level targets, wherein said adjudicating, transforming, evaluating, and qualifying are performed by software modules of an execution engine.

12. The system of claim 11, said comparing the evaluated operational data at the root node of the tree with the specified service level targets identifying data points selected from the group consisting of good data points of the operational data meeting the specified service level targets, bad data points of the operational data not meeting the specified service level targets, and combinations thereof.

13. The system of claim 11, wherein the method further comprises:
   precompiling the tree prior to said evaluating, and
   interpreting the precompiled tree during said evaluating.

14. The system of claim 13, wherein said interpreting the precompiled tree employs a recursive algorithm to traverse the tree from the leaf nodes to the root node.

15. The system of claim 11, wherein said qualifying further comprises:
   determining differentials by which the identified data points differ from the specified service level targets;
   determining, from the differentials, a margin by which the identified data points contribute to meeting or not meeting the specified service level targets; and
   storing the differentials, the margin, or differentials and the margin in a datastore.

16. The system of claim 11, wherein the intermediate results comprise an operator at each node other than the root node, wherein the operator at each non-leaf node has an argument that is a child node of said each non-leaf node, and wherein the operator at each leaf node does not have an argument.

17. The system of claim 16, wherein the operator at each leaf node comprises a quantity to be calculated from an environment of the at least one service level, a reference to measurement data to be used during said evaluating, or a combination thereof.

18. The system of claim 16, wherein the operator comprised by each node has an operator code that is used as an index into a function table in an operator library.

19. The system of claim 16, wherein said qualifying the intermediate results comprises performing a recursive algorithm to traverse the tree from the root node to the leaf nodes by:
   recursively generating the new service level targets for the operators at the nodes other than the root node by using a rule specific to each operator; and
   calculating differentials by which the intermediate results at the nodes other than the root node differ from the corresponding new service level targets to identify data values selected from the group consisting of good data values meeting the new service level targets, bad data values not meeting the new service level targets, and combinations thereof.

20. The system of claim 19, wherein said recursively generating the new service level targets comprises applying an inverse of the operator at each non-leaf node to a service level target currently at said each non-leaf node to generate the new service level target at a child node of said each non-leaf node.

* * * * *